US012545967B2

(12) United States Patent
Taneda et al.

(10) Patent No.: US 12,545,967 B2
(45) Date of Patent: Feb. 10, 2026

(54) METHOD FOR RECOVERING SUGAR

(71) Applicant: JGC HOLDINGS CORPORATION, Kanagawa (JP)

(72) Inventors: Daisuke Taneda, Ibaraki (JP); Shohei Okino, Ibaraki (JP); Yoshiki Ueno, Ibaraki (JP)

(73) Assignee: JGC HOLDINGS CORPORATION, Kanagawa (JP)

( * ) Notice: Subject to any disclaimer, the term of this patent is extended or adjusted under 35 U.S.C. 154(b) by 651 days.

(21) Appl. No.: 17/917,248

(22) PCT Filed: Mar. 23, 2021

(86) PCT No.: PCT/JP2021/012015
§ 371 (c)(1),
(2) Date: Oct. 6, 2022

(87) PCT Pub. No.: WO2021/205867
PCT Pub. Date: Oct. 14, 2021

(65) Prior Publication Data
US 2023/0160026 A1 May 25, 2023

(30) Foreign Application Priority Data

Apr. 8, 2020 (JP) ................................. 2020-069876

(51) Int. Cl.
*C13B 20/14* (2011.01)
*B01D 15/18* (2006.01)
(Continued)

(52) U.S. Cl.
CPC ............ *C13B 20/14* (2013.01); *B01D 15/185* (2013.01); *B01D 15/362* (2013.01); *B01D 15/363* (2013.01); *B01D 15/426* (2013.01)

(58) Field of Classification Search
None
See application file for complete search history.

(56) References Cited

U.S. PATENT DOCUMENTS 3,806,363 A 4/1974 Takasaki
2017/0362194 A1 12/2017 Jansen et al.

FOREIGN PATENT DOCUMENTS

EP 0481603 4/1992
JP S60130400 7/1985
(Continued)

OTHER PUBLICATIONS

Chen et al, Ion exchange separation for recovery of monosaccharides, organic acids and phenolic compounds from hydrolysates of lignocellulosic biomass, Separation and Purification Technology, pp. 100-106 (Year: 2016).*

(Continued)

*Primary Examiner* — Stefanie J Cohen
(74) *Attorney, Agent, or Firm* — JCIPRNET

(57) ABSTRACT

A method of recovering a sugar by separating a fermentation inhibitor and the sugar from a sugar solution containing the fermentation inhibitor, the method including: bringing the sugar solution containing the fermentation inhibitor into contact with a basic anion exchange resin filled into a column, followed by separation of the fermentation inhibitor and the sugar by a difference in retention time therebetween through use of water as an eluent, and separate recovery of a fraction containing the fermentation inhibitor and a fraction containing the sugar, wherein the basic anion exchange resin is previously treated with a solution containing the fermentation inhibitor.

10 Claims, 13 Drawing Sheets

(51) Int. Cl.
 B01D 15/36 (2006.01)
 B01D 15/42 (2006.01)

(56) References Cited

FOREIGN PATENT DOCUMENTS

| JP | 2007520195 | 7/2007 |
| JP | 2007237057 | 9/2007 |
| JP | 2009095282 | 5/2009 |
| JP | 2011078327 | 4/2011 |
| JP | 2014083003 | 5/2014 |
| JP | 2017074010 | 4/2017 |

OTHER PUBLICATIONS

"International Search Report (Form PCT/ISA/210) of PCT/JP2021/012015", mailed on Jun. 15, 2021, with English translation thereof, pp. 1-6.
Hirotaka Matsuura et al., "Separation of Sulfuric Acid and Monosaccharides with a Strong-Base Anion Exchange Resin Containing Polystyrenesulfonate as Polymeric Counter Ion to Reduce Tailing of Sulfuric Acid", Journal of Ion Exchange, Jan. 2014, pp. 81-87.
"Search Report of Europe Counterpart Application", issued on Jun. 14, 2024, pp. 1-13.
"Office Action of India Counterpart Application", issued on Dec. 5, 2024, p. 1-p. 6.

* cited by examiner

METHOD FOR RECOVERING SUGAR

CROSS-REFERENCE TO RELATED APPLICATION

This application is a 371 application of the international PCT application serial no. PCT/JP2021/012015, filed on Mar. 23, 2021, which claims the priority benefit of Japan application no. 2020-069876, filed on Apr. 8, 2020. The entirety of each of the above-mentioned patent applications is hereby incorporated by reference herein and made a part of this specification.

TECHNICAL FIELD

The present invention relates to a method of recovering a sugar. Specifically, the present invention relates to a method of recovering a sugar by separating a fermentation inhibitor and the sugar from a sugar solution containing the fermentation inhibitor. This application claims priority from Japanese Patent Application No. 2020-069876, filed on Apr. 8, 2020, the contents of which are incorporated herein by reference in their entirety.

BACKGROUND ART

In recent years, a technology for the production of a substance, such as an alcohol such as butanediol, an amino acid, or lactic acid, through utilization of a microorganism has been put into practical use. Along with significant advancement of a gene analysis technology and a gene editing technology, it has started to become possible to cause the microorganism to produce a substance, which has heretofore been impossible to produce by the microorganism, through the manipulation of a gene of the microorganism.

In general, a microorganism utilizes a saccharine material to produce ethanol, an amino acid, or the like. At that time, when the saccharine material contains a certain concentration or more of impurities, the fermentation yield of a target product may reduce or the proliferation of the microorganism may be suppressed. A substance having such influence on the microorganism is called a fermentation inhibitor, and the kind of the substance and the concentration at which the substance inhibits the fermentation or the proliferation largely vary depending on the microorganism. In particular, a microorganism that is genetically modified shows such a tendency that the microorganism is susceptible to the inhibitor as compared to the microorganism before the modification. Accordingly, when a target substance is produced with the genetically modified microorganism, a saccharine material required for the cultivation and fermentation of the microorganism needs to have a fermentation inhibitor content conforming to the inhibitor resistance of the microorganism.

In the research and development of a substance production process including using a microorganism, and the practical application of the process, a food-based saccharine material having a small fermentation inhibitor content has heretofore been used. Specifically, glucose produced from grain, such as corn and potatoes, has been mainly used. However, to widely spread the substance production process including using the microorganism in the future, the utilization of a non-food-based saccharine material instead of the food-based saccharine material has been desired for avoiding a competitive problem with food. Typical examples of the non-food-based saccharine material include molasses that is a by-product produced from a sugar factory and a cellulose-based saccharide produced from a non-food-based biomass (e.g., a tree or grass).

Each of those non-food-based saccharine materials has an organic acid concentration higher than that of the food-based saccharine material, and contains a coloring component. It has been found that when such organic acid or coloring component is present at a certain concentration or more, the organic acid or the coloring component inhibits the cultivation and fermentation of a microorganism. In view of the foregoing, there has been required the development of a technology for the preparation of a saccharine material suitable for a substance production process including using a microorganism through the removal of a fermentation inhibitor for the microorganism from a non-food-based saccharine material.

A membrane separation technology, an adsorption removal technology (see, for example, Patent Literatures 1 to 3), a sedimentation separation technology, or the like has heretofore been researched and developed as a technology for the removal of a fermentation inhibitor for a microorganism from a non-food-based saccharine material.

However, the technology for the removal of a fermentation inhibitor for a microorganism from a non-food-based saccharine material, which is described in, for example, each of Patent Literatures 1 to 3, is susceptible to improvement in terms of cost, separation efficiency, and the like.

CITATION LIST

Patent Literature

[PTL 1] JP 2009-95282 A
[PTL 2] JP 2011-78327 A
[PTL 3] JP 2014-83003 A

SUMMARY OF INVENTION

Technical Problem

The present invention has been made in view of the above-mentioned circumstances, and provides a method of recovering a sugar by separating a fermentation inhibitor and the sugar from a sugar solution containing the fermentation inhibitor, the method being inexpensive and having satisfactory separation efficiency.

Solution to Problem

That is, the present invention includes the following aspects.

(1) A method of recovering a sugar by separating a fermentation inhibitor and the sugar from a sugar solution containing the fermentation inhibitor, the method including
  bringing the sugar solution containing the fermentation inhibitor into contact with an ion exchange resin filled into a column, followed by separation of the fermentation inhibitor and the sugar by a difference in retention time therebetween through use of water as an eluent, and separate recovery of a fraction containing the fermentation inhibitor and a fraction containing the sugar,
  wherein the ion exchange resin is previously treated with a solution containing the fermentation inhibitor.
(2) The method according to Item (1), wherein the ion exchange resin is a strongly basic anion exchange resin or a strongly acidic cation exchange resin.

(3) The method according to Item (1) or (2), wherein the ion exchange resin has an average particle diameter of 100 μm or more and 600 μm or less.

(4) The method according to any one of Items (1) to (3), further including, at a time of the previous treatment with the solution containing the fermentation inhibitor, bringing the sugar solution containing the fermentation inhibitor into contact with the ion exchange resin to cause the ion exchange resin to adsorb the fermentation inhibitor, to thereby separate the fermentation inhibitor and the sugar.

(5) The method according to any one of Items (1) to (4), wherein in the recovery, the fraction containing the sugar is recovered after the fraction containing the fermentation inhibitor.

(6) The method according to any one of Items (1) to (5), wherein the sugar solution containing the fermentation inhibitor includes a monosaccharide.

(7) The method according to any one of Items (1) to (6), wherein the sugar solution containing the fermentation inhibitor includes sucrose.

(8) The method according to Item (7), further including, before the recovery, decomposing the sucrose into glucose and fructose.

(9) The method according to any one of Items (1) to (8), wherein the recovery is performed at a temperature of 25° C. or more.

(10) The method according to any one of Items (1) to (9), wherein the fermentation inhibitor includes at least one kind selected from the group consisting of: an organic acid; and a coloring component.

Advantageous Effects of Invention

According to the method of any one of the above-mentioned aspects, the method of recovering a sugar by separating a fermentation inhibitor and the sugar from a sugar solution containing the fermentation inhibitor, the method being inexpensive and having satisfactory separation efficiency, can be provided.

DESCRIPTION OF EMBODIMENTS

<Sugar Solution Containing Fermentation Inhibitor>

Figure 1:
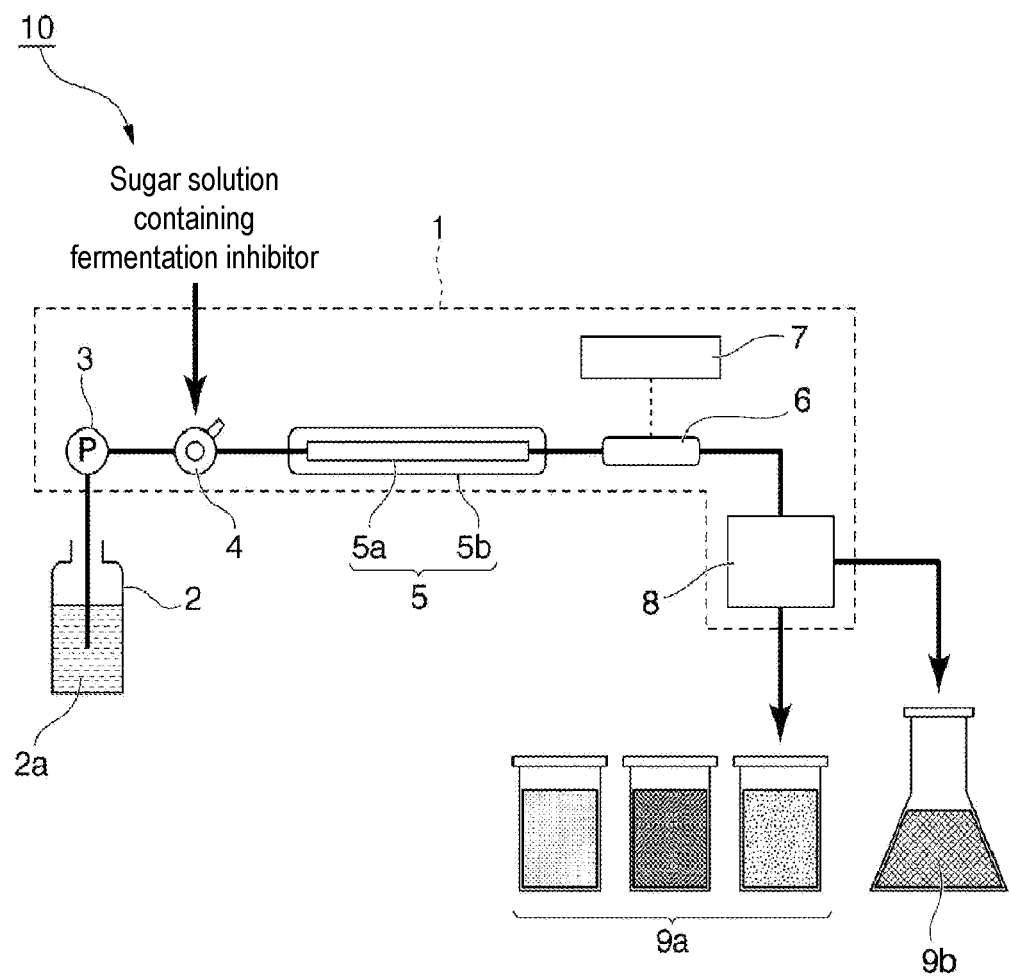
FIG. 1 is a schematic configuration diagram for illustrating an apparatus according to an embodiment of the present invention.

The term "sugar solution containing a fermentation inhibitor" as used herein refers to a sugar solution obtained from a biomass raw material. The biomasses are roughly classified into the following three kinds: a waste-based biomass, a resource crop, and an unused biomass. Examples of the waste-based biomass include molasses, used paper, waste wood, a waste building material, and garbage. The molasses is a blackish brown liquid produced as a by-product at the time of sugar production including using sugarcane or sugar beet as a raw material. Examples of the resource crop include sugarcane, sugar beet, potato, sweet potato, and corn. Examples of the unused biomass include sugarcane bagasse, rice straw, wheat straw, rice husk, and a corn residue (corn stover, corn cob, or corn hull). The unused biomass may hereinafter be referred to as "cellulose-based biomass." Those biomasses may be used alone or in combination thereof.

In addition, the sugar solution containing the fermentation inhibitor may be an artificially synthesized sugar solution obtained by mixing a sugar (hereinafter also referred to as "saccharine component") and the fermentation inhibitor so as to have the same composition as that of the sugar solution obtained from the biomass raw material described above.

Of such sugar solutions, a sugar solution obtained from molasses or a cellulose-based biomass is preferred as the sugar solution containing the fermentation inhibitor, the solution serving as an object to which a method of this embodiment is applied, and the molasses is more preferred.

When the sugar solution containing the fermentation inhibitor is molasses, the main sugar in the molasses is, for example, sucrose, glucose, or fructose.

When the sugar solution containing the fermentation inhibitor is a sugar solution obtained from a cellulose-based biomass, the main saccharine component of the sugar solution is, for example, glucose, xylose, or mannose.

The sugar (saccharine component) to be recovered by the method of this embodiment is preferably a disaccharide or a monosaccharide, more preferably a monosaccharide, still more preferably at least one kind of monosaccharide selected from the group consisting of: glucose; and fructose.

A known technology such as a method including subjecting a cellulose-based biomass raw material to pretreatment, such as pulverization, steaming, or treatment with an acid or an alkali, as required, and then saccharifying the treated raw material with an enzyme (e.g., cellulase) to provide a sugar solution may be appropriately selected and performed as a method of obtaining a sugar solution from a cellulose-based biomass.

The fermentation inhibitor means a substance that inhibits the cultivation and fermentation of a microorganism in a substance production system based on the microorganism in which a sugar solution is used as a raw material. Specific examples thereof include an organic acid, a coloring component, a saccharification by-product, and salts. Examples of the organic acid include formic acid, acetic acid, and lactic acid. Examples of the coloring component include melanoidin, polyphenol, and caramel. The saccharification by-product is a substance produced as a by-product at the time of the production of a sugar solution by the saccharification of the above-mentioned biomass raw material. Specific examples thereof include furans, such as furfural and 5-hydroxymethylfurfural (HMF). The method of this embodiment is suitable for the separation of the organic acid and the coloring component out of such inhibitors from a sugar solution.

Method of Recovering Sugar Solution

First Embodiment

A method according to an embodiment of the present invention (hereinafter referred to as "method of this embodiment") is a method of recovering a sugar by separating a fermentation inhibitor and the sugar from a sugar solution containing the fermentation inhibitor. The method of this embodiment includes separately recovering a fraction containing the fermentation inhibitor and a fraction containing the sugar (hereinafter referred to as "recovery step").

In the recovery step, the sugar solution containing the fermentation inhibitor is brought into contact with a basic anion exchange resin filled into a column. After that, the fermentation inhibitor and the sugar are separated by a difference in retention time therebetween through use of water as an eluent, and the fraction containing the fermentation inhibitor and the fraction containing the sugar are separately recovered.

The basic anion exchange resin is previously treated with a solution containing the fermentation inhibitor.

According to the method of this embodiment, as described in Examples to be described later, the sugar can be recovered by separating the fermentation inhibitor and the sugar from the sugar solution containing the fermentation inhibitor with satisfactory separation efficiency. In addition, the method of this embodiment enables continuous separation because the method eliminates the need for the regeneration of the ion exchange resin.

Next, each step for forming the method of this embodiment is described in detail below.

[Recovery Step]

In the recovery step, first, the sugar solution containing the fermentation inhibitor is brought into contact with the basic anion exchange resin filled into the column. Next, the fermentation inhibitor and the sugar are separated by the difference in retention time therebetween through use of the water as the eluent, and the fraction containing the fermentation inhibitor and the fraction containing the sugar are separately recovered.

In ion exchange chromatography, when a sample is brought into contact with an ion exchange resin, the pH of the sample is typically adjusted so that the resolution of a target component may be maximum with respect to impurities in the sample. Specifically, the separation of the target component and the impurities in the sample is achieved by: adjusting the pH to the value at which the amount of the target component adsorbing to the ion exchange resin is maximized and the amount of the impurities adsorbing thereto is suppressed to the minimum; causing the ion exchange resin to adsorb the target component and to pass all of the impurities therethrough; and then eluting the target component with an eluent increased in salt concentration (ionic strength). Alternatively, the separation of the target component and the impurities in the sample is achieved by: adjusting the pH to the value at which the adsorption amount of the target component is suppressed to the minimum or zero and the adsorption amount of the impurities is maximized; and causing the ion exchange resin to adsorb the impurities and to pass the entirety of the target component therethrough.

However, in the method of this embodiment, the fermentation inhibitor and the sugar are separated by a difference (difference in strength) between the respective chemical affinities of the fermentation inhibitor and the saccharine component (in particular, glucose and fructose) in the sugar solution for the ion exchange resin while the ion exchange resin is not used in its original application where an adsorption phenomenon is utilized, and the pH of the solution is not adjusted. Specifically, first, the sugar solution containing the fermentation inhibitor is injected into the column filled with the ion exchange resin. Immediately after the injection into the column, the fermentation inhibitor and the saccharine component are not separated. Next, the water is injected as the eluent into the column to wash away the sugar solution containing the fermentation inhibitor toward the outlet of the column. The ionic strength of the water is weaker than that of the eluent to be used in the typical ion exchange chromatography described above, and hence the difference in strength between the chemical affinities of the respective components in the sugar solution for the ion exchange resin is kept. Accordingly, a component having a weak chemical affinity for the ion exchange resin is washed away at a rate comparable to the flow rate of the column, and a component having a strong chemical affinity for the ion exchange resin is slowly washed away from the column. Thus, a difference in retention time in the column between the fermentation inhibitor and the sugar solution containing the saccharine component occurs, and hence the fermentation inhibitor and the saccharine component can be separated. As described in Examples to be described later, the fraction containing the sugar may be recovered after the fraction containing the fermentation inhibitor, or the fraction containing the sugar may be recovered before the fraction containing the fermentation inhibitor.

The basic anion exchange resin is previously treated with the solution containing the fermentation inhibitor. That is, the resin is broken through with an anion component in the sugar solution containing the fermentation inhibitor. When the basic anion exchange resin previously treated with the solution containing the fermentation inhibitor is used, no component in the sugar solution adsorbs to the ion exchange resin, and hence the fermentation inhibitor and the saccharine component in the sugar solution can be separated by the difference (difference in strength) between the respective chemical affinities of the fermentation inhibitor and the saccharine component for the ion exchange resin. The phrase "broken through" as used herein means a state in which adsorption to the ion exchange groups of the ion exchange resin is saturated with an arbitrary ion component (state in which all the ion exchange groups are each substituted with the arbitrary ion component). At this time, the concentration of the arbitrary ion component in the solution supplied to the column and the concentration of the arbitrary ion component in a solution eluted from the outlet of the column are comparable to each other. In the method of this embodiment, for example, the ratio (percentage) of the concentration of a specific fermentation inhibitor in the solution eluted from the outlet of the column to the concentration of the specific fermentation inhibitor in the solution containing the fermentation inhibitor, the solution being supplied to the column, is preferably 75% or more, more preferably 80% or more, still more preferably 90% or more, particularly preferably 95% or more, most preferably 100%.

In addition, a sugar solution exemplified in the above-mentioned section <Sugar Solution containing Fermentation Inhibitor> or an artificially synthesized solution, which is obtained by adding a fermentation inhibitor and an inorganic salt in the exemplified sugar solution containing the fermentation inhibitor to a solvent such as water and mixing the materials, may be used as the solution containing the fermentation inhibitor with which the basic anion exchange resin is treated.

In addition, when the solution containing the fermentation inhibitor is a sugar solution containing a fermentation inhibitor, the sugar solution containing the fermentation inhibitor with which the basic anion exchange resin is previously treated and the sugar solution containing the fermentation inhibitor to be subjected to chromatographic separation in the recovery step may be identical to or different from each other.

In addition, a method of treating the basic anion exchange resin with the solution containing the fermentation inhibitor (hereinafter also referred to as "break-through method" or "break-through step") may be performed by, for example, such a procedure as described below. First, the basic anion exchange resin is filled into the column, and the solution containing the fermentation inhibitor is fed from the inlet of the column. Next, the establishment of a state in which the basic anion exchange resin in the column is broken through as described above is recognized, and then water is fed as a washing liquid from the inlet of the column to wash off the solution containing the fermentation inhibitor, the solution remaining in the column. The timing at which the washing with the water is finished may be determined by identifying the concentration of the fermentation inhibitor in the solution discharged from the outlet of the column. Specifically, the washing with the water may be finished by recognizing that the concentration of the fermentation inhibitor in the solution discharged from the outlet of the column is, for example, 1 w/v % or less, preferably 0.1 w/v % or less, more preferably 0 w/v %. Thus, the column filled with the basic anion exchange resin previously treated with the solution containing the fermentation inhibitor can be obtained.

In addition, when the basic anion exchange resin is a new product, the method of this embodiment preferably further includes, before the recovery step, bringing the sugar solution containing the fermentation inhibitor into contact with the new basic anion exchange resin to cause the basic anion exchange resin to adsorb the fermentation inhibitor, to thereby separate the fermentation inhibitor and the sugar (hereinafter referred to as "adsorption separation step"). The term "new basic anion exchange resin" as used herein means a basic anion exchange resin in an unused state, that is, a state in which its anion exchange groups are not substituted with any other anions.

When the adsorption separation step is performed before the recovery step, the treatment of the basic anion exchange resin with the sugar solution containing the fermentation inhibitor, and the separation of the fermentation inhibitor and the sugar can be simultaneously performed. That is, the adsorption separation step corresponds to the above-mentioned break-through step.

In the adsorption separation step, the sugar solution containing the fermentation inhibitor to be used may be identical to or different from the sugar solution containing the fermentation inhibitor to be subjected to the chromatographic separation in the recovery step, but is preferably identical thereto. When those sugar solutions are identical to each other, the adsorption separation step and the recovery step can be continuously performed. A method of continuously performing the adsorption separation step and the recovery step may be performed by, for example, such a procedure as described below. First, the new basic anion exchange resin is filled into the column, and the sugar solution containing the fermentation inhibitor is fed from the inlet of the column. Thus, the new basic anion exchange resin is caused to adsorb the fermentation inhibitor. Meanwhile, the sugar does not adsorb to the basic anion exchange resin, and is hence separated and recovered. Next, the establishment of a state in which the basic anion exchange resin in the column is broken through as described above is recognized. Thus, the separation of the fermentation inhibitor and the sugar by adsorption separation (adsorption separation step) is completed. Subsequently, the procedure transfers to the separation of the fermentation inhibitor and the sugar by a difference (difference in strength) between the chemical affinities thereof for the basic anion exchange resin in a broken-through state as described above (recovery step). The operation of the separation is as follows: as described above, water is injected as an eluent into the column to wash away the sugar solution containing the fermentation inhibitor toward the outlet of the column, and hence the fermentation inhibitor and the sugar are separated by the difference (difference in strength) between their chemical affinities for the basic anion exchange resin in the broken-through state.

In addition, the basic anion exchange resin may be a weakly basic anion exchange resin, or may be a strongly basic anion exchange resin. Of those, a strongly basic anion exchange resin is preferred. An example of the weakly basic anion exchange resin is a resin having a diethylaminoethyl (DEAE) group as an ion exchanger. An example of the strongly basic anion exchange resin is a resin having a quaternary ammonium group as an ion exchanger.

The basic anion exchange resin may be a $Cl^-$ type, or may be a $OH^-$ type, but is preferably a $Cl^-$ type.

A resin for forming the ion exchange resin is formed of, for example, a (meth)acrylic polymer, a styrene-based polymer, a phenol-based polymer, or silica gel. In addition, the resin may be crosslinked with an aromatic crosslinkable monomer, such as divinyltoluene, divinylxylene, divinylnaphthalene, or divinylbenzene, or an aliphatic crosslinkable monomer, such as isoprene, ethylene glycol diacrylate, ethylene glycol dimethacrylate, or N,N'-methylene-bis-acrylamide. Those resins may be used alone or in combination thereof.

The average particle diameter of the ion exchange resin is, for example, 10 μm or more and 1,000 μm or less, preferably 100 μm or more and 600 μm or less, more preferably 125 μm or more and 575 μm or less, still more preferably 200 μm or more and 500 μm or less, particularly preferably 200 μm or more and 400 μm or less, most preferably 250 μm or more and 350 μm or less.

When the average particle diameter of the ion exchange resin is equal to or less than the above-mentioned upper limit value, the degree to which the fermentation inhibitor and the sugar are separated is further improved. Meanwhile, even when the average particle diameter of the ion exchange resin is smaller than 10 μm, a high degree of separation can be achieved. However, when the average particle diameter of the ion exchange resin is equal to or more than the above-mentioned lower limit value, the cost of the ion exchange resin can be further suppressed.

The average particle diameter of the ion exchange resin may be measured and calculated on the basis of, for example, "PARTICLE SIZE DISTRIBUTION" specified in ASTM D2187-17.

Examples of the water to be used as the eluent include pure water and ultrapure water.

In the recovery step, the contact between the sugar solution containing the fermentation inhibitor and the ion exchange resin, and the separation and recovery of the fermentation inhibitor and the sugar may be typically performed at room temperature or more, specifically under a temperature of 20° C. or more, and are preferably performed under a temperature of 25° C. or more, more preferably performed under a temperature of 40° C. or more, still more preferably performed under a temperature of 50° C. or more, particularly preferably performed under a temperature of 60° C. or more. When the recovery step is performed under a temperature equal to or more than the above-mentioned lower limit values, as described in Examples to be described later, the efficiency with which the fermentation inhibitor and the sugar are separated can be further improved, and hence a higher concentration of the sugar can be recovered.

Meanwhile, the upper limit value of the temperature may be set to the heat-resistant temperature of the ion exchange resin or less, and for example, the temperature may be set to 100° C., may be set to 90° C., or may be set to 80° C. In addition, when the heat-resistant temperature of the ion exchange resin is more than 100° C., the upper limit value of the temperature may be more than 100° C. as long as the upper limit value is equal to or less than the heat-resistant temperature of the ion exchange resin.

A method of controlling the temperature in the recovery step is, for example, a method including previously heating the sugar solution containing the fermentation inhibitor to be used so that its temperature may fall within a predetermined temperature range, or a method including controlling a temperature in the column within the predetermined temperature range with a column oven or the like.

In the recovery step, the other conditions for the ion exchange chromatography may be appropriately determined by a person skilled in the art in accordance with a known method.

Second Embodiment

A method of this embodiment is a method of recovering a sugar by separating a fermentation inhibitor and the sugar from a sugar solution containing the fermentation inhibitor. The method of this embodiment includes a removal step and a recovery step in the stated order.

In the removal step, an alkaline earth metal ion is removed from the sugar solution containing the fermentation inhibitor.

In the recovery step, the sugar solution containing the fermentation inhibitor after the removal step is brought into contact with a monovalent cation-type acidic cation exchange resin filled into a column. After that, the fermentation inhibitor and the sugar are separated by a difference in retention time therebetween through use of water as an eluent, and a fraction containing the fermentation inhibitor and a fraction containing the sugar are separately recovered.

The method according to the second embodiment of the present invention differs from the method according to the above-mentioned first embodiment in that the former method further includes the removal step and in that the monovalent cation-type acidic cation exchange resin is used as an ion exchange resin in the recovery step, and the method is identical to the method according to the above-mentioned first embodiment in the other points.

According to the method according to the second embodiment of the present invention, as described in Examples to be described later, the sugar can be recovered by separating the fermentation inhibitor and the sugar from the sugar solution containing the fermentation inhibitor with satisfactory separation efficiency. In addition, the method according to the second embodiment of the present invention enables continuous separation because the method eliminates the need for the regeneration of the ion exchange resin.

Next, each step for forming the method according to the second embodiment of the present invention is described in detail below. The description of a portion overlapping the method according to the above-mentioned first embodiment is omitted.

[Removal Step]

The sugar solution containing the fermentation inhibitor generally contains an alkaline earth metal salt. Accordingly, in the removal step, the alkaline earth metal ion is removed from the sugar solution containing the fermentation inhibitor. This is because of the following reason. When the recovery step is performed by using the monovalent cation-type acidic cation exchange resin, the adsorptive power of a divalent cation to an ion exchanger is stronger than that of a monovalent cation, and hence a cation bonded to the ion exchanger is replaced from a monovalent cation to the alkaline earth metal ion that is a divalent cation with time. Thus, the respective chemical affinities of the fermentation inhibitor and the saccharine component in the sugar solution for the ion exchange resin may change to reduce the separability of the fermentation inhibitor and the saccharine component. Accordingly, previous removal of the alkaline earth metal ion from the sugar solution containing the fermentation inhibitor can keep the separability of the fermentation inhibitor and the saccharine component at a high level.

The alkaline earth metal salt as used herein refers to a salt containing an alkaline earth metal ion (particularly $Ca^{2+}$) as a constituent ion. Examples of the alkaline earth metal ion include a magnesium ion, a calcium ion, and a barium ion. Specific examples of the alkaline earth metal salt include chlorides, hydroxides, sulfuric acid salts, and nitric acid salts of the alkaline earth metal ions.

A method of removing the alkaline earth metal ion is, for example, a method including adding sodium carbonate or the like to the sugar solution to reduce the solubility of the alkaline earth metal ion, to thereby sediment and remove the ion. A specific example thereof is a method including adding sodium carbonate to the sugar solution containing the fermentation inhibitor to bring a calcium ion into the form of calcium carbonate, to thereby sediment and remove the ion. According to the method, the solubility of calcium carbonate is small, and hence a calcium component can be deposited by bringing calcium present in the form of calcium chloride or the like in the sugar solution into the form of calcium carbonate.

[Recovery Step]

The acidic cation exchange resin to be used in the recovery step may be a weakly acidic cation exchange resin, or may be a strongly acidic cation exchange resin. Of those, a strongly acidic cation exchange resin is preferred. An example of the weakly acidic cation exchange resin is a resin having a carboxylic acid group or a carboxymethyl (CM) group as an ion exchanger. An example of the strongly acidic cation exchange resin is a resin having a sulfonic acid group as an ion exchanger.

The acidic cation exchange resin is a monovalent cation type. Examples of the monovalent cation type include a $Na^+$ type and a $H^+$ type. Of those, a $Na^+$ type is preferred.

The other conditions in the recovery step are identical to those of the method according to the above-mentioned first embodiment.

Third Embodiment

A method of this embodiment preferably further includes a decomposition step before the recovery step when the sugar solution containing the fermentation inhibitor contains sucrose as a saccharine component. The decomposition step may be performed before the above-mentioned removal step, or may be performed thereafter. In the decomposition step, sucrose is decomposed into glucose and fructose.

The method according to the third embodiment of the present invention differs from the method according to the above-mentioned first embodiment or the above-mentioned second embodiment in that the former method further includes the decomposition step, and the method is identical to the method according to the above-mentioned first embodiment or the above-mentioned second embodiment in the other points.

According to the method according to the third embodiment of the present invention, the fermentation inhibitor and the saccharine component can be separated with more satisfactory separation efficiency.

Next, the respective steps for forming the method according to the third embodiment of the present invention are described in detail below. The description of a portion overlapping the method according to the above-mentioned first embodiment or the above-mentioned second embodiment is omitted.

[Decomposition Step]

In the decomposition step, sucrose is decomposed into glucose and fructose. In the recovery step, sucrose tends to be hardly separated from the fermentation inhibitor, and hence may be incorporated not only into the fraction containing the sugar but also into the fraction containing the fermentation inhibitor. Meanwhile, the chemical affinities of glucose and fructose for the ion exchange resin largely differ from the chemical affinity of the fermentation inhibitor for the ion exchange resin, and hence glucose and fructose are easily separated from the fermentation inhibitor as described in Examples to be described later. Accordingly, when sucrose is previously decomposed into glucose and fructose, the fermentation inhibitor and the saccharine component can be separated with more satisfactory separation efficiency.

A method of decomposing sucrose is, for example, a known method, such as a hydrolysis method based on an acid or a decomposition method based on an enzyme such as invertase (also referred to as "saccharase", "sucrase", or "β-D-fructofuranosidase").

[Other Step]

The method of this embodiment may further include any other step such as a detection step as required. The method preferably includes the detection step after the recovery step. In the detection step, the fermentation inhibitor and the saccharine component in the respective fractions obtained in the recovery step are detected.

A detection method is, for example, a method including measuring the respective concentrations of the fermentation inhibitor and the saccharine component in the respective fractions eluted from the column with known detecting means, such as a detector or a detection kit, to detect the inhibitor and the component.

The method of this embodiment may be performed with, for example, such an apparatus as described below.

FIG. 1 is a schematic diagram for illustrating an apparatus according to an embodiment of the present invention. An apparatus 10 illustrated in FIG. 1 includes a liquid chromatograph 1 and an eluent-supplying portion 2.

When the apparatus 10 is used, as described in Examples to be described later, the sugar can be recovered by separating the fermentation inhibitor and the sugar from the sugar solution containing the fermentation inhibitor with satisfactory separation efficiency. In addition, the apparatus of this embodiment enables continuous separation because the apparatus eliminates the need for the regeneration of the ion exchange resin.

[Liquid Chromatograph]

Although the liquid chromatograph 1 is described by taking a batch-type chromatographic separator as an example, the chromatograph may be any other chromatographic separator.

The liquid chromatograph 1 includes a liquid-feeding portion 3, a sample-injecting portion 4, a separating portion 5, a detecting portion 6, and a data-processing portion 7.

The liquid-feeding portion 3 is configured to feed an eluent at a constant flow rate without any pressure fluctuation, and a known pump in accordance with a liquid-feeding flow rate range may be appropriately selected and used. Specifically, in the case of a liquid-feeding flow rate of about several hundreds of microliters per minute, a pump for semi-micro LC may be used, in the case of a liquid-feeding flow rate of about several milliliters per minute, an analytical pump may be used, and in the case of a liquid-feeding flow rate of several tens of milliliters per minute or more, a pump for fractionation may be used.

The sample-injecting portion 4 is configured to inject the sugar solution containing the fermentation inhibitor into a column, and comes in a manual injector in which the solution is manually injected and an autosampler in which the solution can be automatically injected. Any one of the manual injector and the autosampler is permitted. The sample-injecting portion 4 may include, for example, a solution-switching valve configured to switch the feeding of the eluent and that of the sugar solution containing the fermentation inhibitor.

The separating portion 5 includes a column 5a. In addition, the separating portion 5 may further include a column oven 5b.

The column 5a is filled with an ion exchange resin. The same resins as those exemplified in the above-mentioned method of recovering a sugar may each be used as the ion exchange resin. The volume of the column is not particularly limited, and may be appropriately set in accordance with the volume of the sugar solution containing the fermentation inhibitor serving as a separation object.

The column oven 5b is configured to keep the temperature of the column constant. Although a temperature in the column oven is not particularly limited, the temperature may be kept at, for example, about 10° C. or more and about 40° C. or less, preferably about 15° C. or more and about 35° C. or less. In addition, when the sugar is recovered under heating, the temperature in the column oven is preferably kept at 50° C. or more, and is more preferably kept at 60° C. or more. When the temperature in the column oven is set to a temperature equal to or more than the above-mentioned lower limit values, as described in Examples to be described later, the efficiency with which the fermentation inhibitor and the sugar are separated can be further improved, and hence a higher concentration of the sugar can be recovered.

Meanwhile, the upper limit value of the temperature in the column oven may be set to the heat-resistant temperature of the ion exchange resin or less, and for example, the temperature may be set to 100° C., may be set to 90° C., or may be set to 80° C. In addition, when the heat-resistant temperature of the ion exchange resin is more than 100° C., the upper limit value of the temperature may be more than 100° C. as long as the upper limit value is equal to or less than the heat-resistant temperature of the ion exchange resin.

The detecting portion 6 is configured to detect components in the respective recovered fractions, and is formed of a known detector generally used in the liquid chromatograph. Examples of the known detector include an ultraviolet-visible spectral detector, a photodiode array (PDA) detector, a differential refractometer, a fluorometric detector, an electrochemical detector, a conductivity detector, a mass spectrometric detector, an optical rotation detector, a circular dichroism detector, and an evaporative light scattering detector.

The data-processing portion 7 is configured to calculate the contents of the respective components in the sugar solution from the areas or heights of peaks detected by the detecting portion, and to output the results.

[Eluent-Supplying Portion]

The eluent-supplying portion 2 is intended to store water 2a as the eluent and to supply the water into the column. The shape and size of the eluent-supplying portion 2 are not particularly limited, and may be appropriately selected. The same waters as those exemplified in the above-mentioned method of recovering a sugar may each be used as the water 2a.

As illustrated in FIG. 1, the apparatus 10 may further include a fraction collector 8 configured to select and fractionate a fraction containing the sugar solution (saccharine component). In the fraction collector 8, fractions 9a containing various saccharine components, such as sucrose, glucose, and fructose, are fractionated, and a fraction 9b containing the fermentation inhibitor is discharged as a waste liquid.

In addition, the apparatus 10 may further include any other configuration known in the liquid chromatograph such as a degasser configured to remove a dissolved gas in the eluent or the sample.

Figure 2:
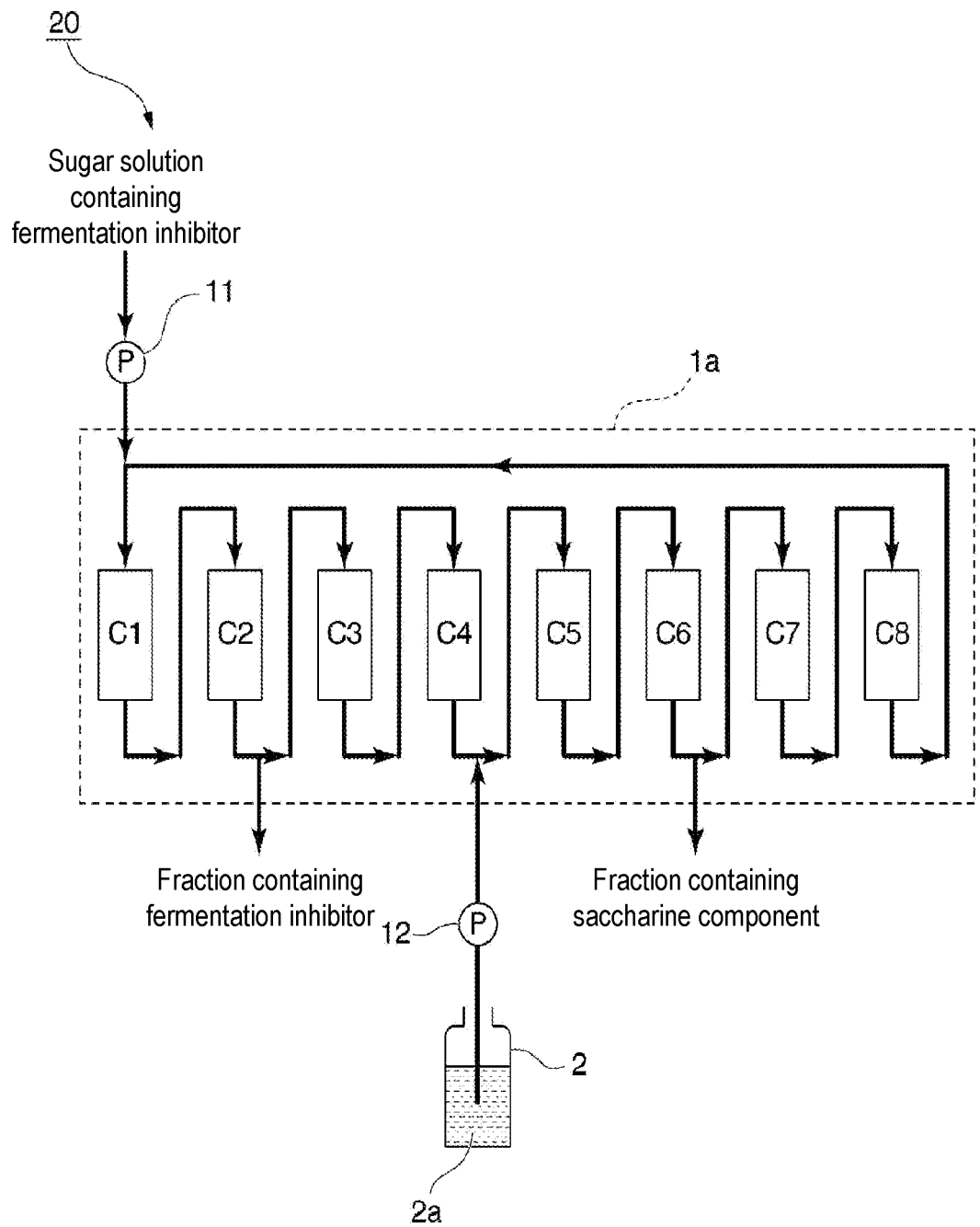
FIG. 2 is a schematic configuration diagram for illustrating an apparatus according to another embodiment of the present invention.

FIG. 2 is a schematic diagram for illustrating an apparatus according to another embodiment of the present invention. An apparatus 20 illustrated in FIG. 2 differs from the apparatus 10 illustrated in FIG. 1 in that the liquid chromatograph 1 is a simulated moving layer system (also referred to as "simulated moving bed system"), and the apparatus 20 is identical to the apparatus 10 in the other configurations.

A simulated moving layer chromatographic separator 1a is an apparatus obtained by connecting a plurality of columns C1, C2, . . . C8 each filled with an ion exchange resin in series and as a closed circuit through pipelines. The number of the columns only needs to be 4 or more, and may be set to, for example, 4, 5, 6, 8, 10, 12, 15, 16, 18, or 20.

As a method of separating the fermentation inhibitor and the sugar with the simulated moving layer chromatographic separator 1a, first, the sugar solution containing the fermentation inhibitor is injected into the first column C1 of the simulated moving layer chromatographic separator 1a with a pump 11 or the like at a constant flow rate without any pressure fluctuation, and a fraction mainly formed of the fermentation inhibitor having a fast moving speed is derived from the second column C2. Meanwhile, a fraction mainly formed of the sugar having a slow moving speed is derived from the sixth column C6 by the injection of the eluent with a pump 12 or the like. Alternatively, the sugar solution containing the fermentation inhibitor is injected into the first column C1 of the simulated moving layer chromatographic separator 1a with the pump 11 or the like at a constant flow rate without any pressure fluctuation, and a fraction mainly formed of the sugar having a fast moving speed is derived from the second column C2. Meanwhile, a fraction mainly formed of the fermentation inhibitor having a slow moving speed is derived from the sixth column C6 by the injection of the eluent with the pump 12 or the like.

In the simulated moving layer chromatographic separator 1a, the fraction mainly formed of the fermentation inhibitor and the fraction mainly formed of the sugar are separated by a difference in moving speed between the respective components.

In the simulated moving layer chromatographic separator 1a, the injection ports of the sugar solution containing the fermentation inhibitor and the eluent, and the derivation ports of the fraction mainly formed of the fermentation inhibitor and the fraction mainly formed of the sugar are switched every certain time period to be sequentially moved backward by one column each. Thus, even when the circulation of the sugar solution containing the fermentation inhibitor is repeated, the respective components do not spread over the entire columns, and hence a high-purity fraction can be continuously derived. That is, the use of the simulated moving layer chromatographic separator 1a can derive each of the fraction mainly formed of the fermentation inhibitor and the fraction mainly formed of the sugar at a high purity, a high concentration, and a high recovery ratio.

The same pumps as those exemplified for the liquid-feeding portion 3 of the above-mentioned apparatus 10 may be used as the pumps 11 and 12.

In addition, the apparatus 20 may further include any other configuration known in the simulated moving layer chromatographic separator such as a degasser configured to remove a dissolved gas in the eluent or the sample.

EXAMPLES

Now, the present invention is described by way of Examples, but the present invention is not limited to the Examples described below.

Example 1

(Method of Recovering Sugar Solution by Liquid Chromatography Using $Na^+$-Type Strongly Acidic Cation Exchange Resin)

First, invertase (manufactured by Mitsubishi-Chemical Foods Corporation, derived from yeast, titer: 769 U/mL) was added to molasses having a sugar concentration of 40 w/v % so that its amount became 4 μL per 1 g of the molasses. The mixture was subjected to a reaction under stirring for 24 hours while its temperature was kept at 50° C. Thus, sucrose in the molasses was decomposed into glucose and fructose.

Figure 3:
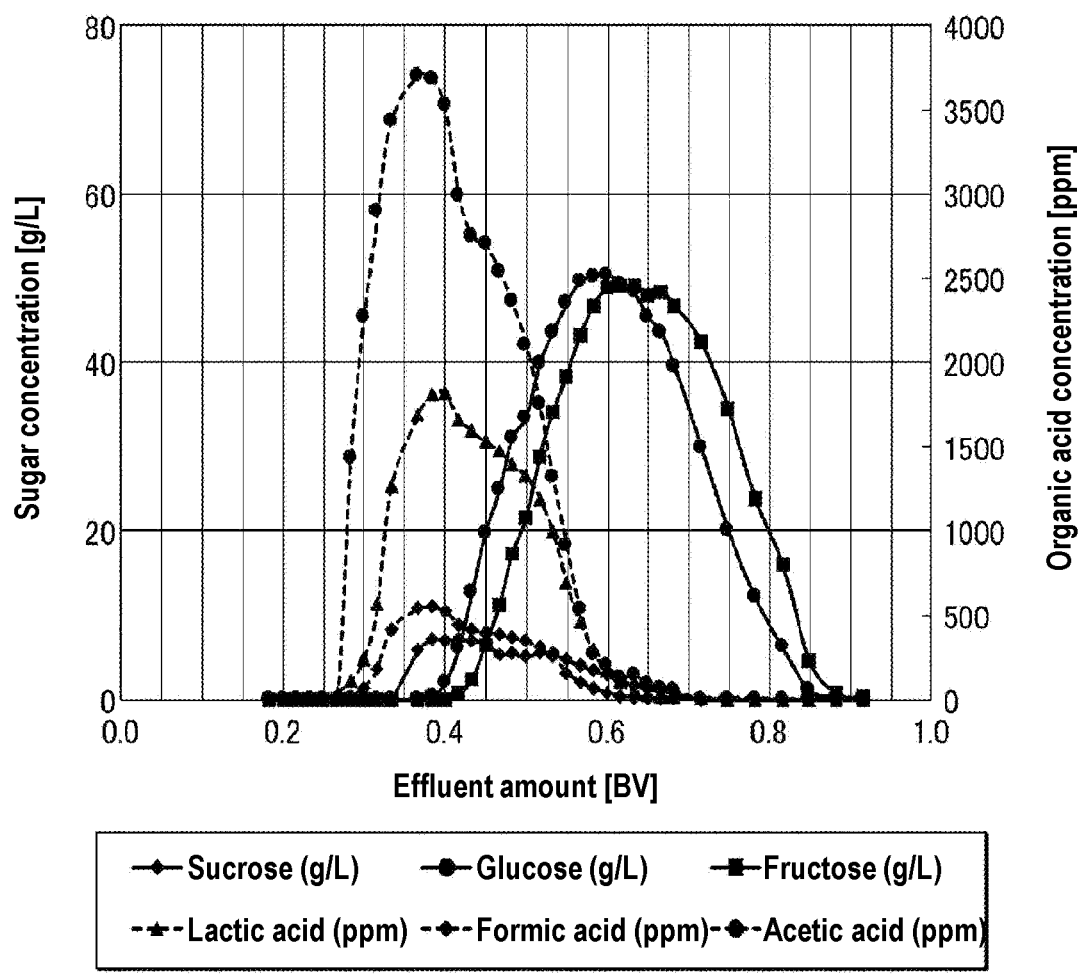
FIG. 3 is a chromatogram in Example 1.

Next, the column of a chromatographic separator was filled with a $Na^+$-type strongly acidic cation exchange resin (manufactured by Mitsubishi Chemical Corporation, product name: "UBK530"). Next, 11 mL of the molasses having a sugar concentration of 40 w/v % was supplied to the column, and then pure water was supplied as an eluent. This test was performed with a batch-type chromatographic separator having the following configuration. Detailed separation conditions are as described below. In addition, a sugar and an organic acid in respective fractions recovered in a fraction collector were analyzed with a high performance liquid chromatograph (HPLC). Detailed analysis conditions are as described below. The results are shown in FIG. 3.

(Chromatographic Separator and Separation Conditions)

Liquid-feeding unit (pump): SMP-23S (Tokyo Rikakikai Co., Ltd.)

Column: 15.8 mmφ×1,090 mm

Resin filling amount: 213.6 mL

Molasses liquid-feeding amount: 11 mL (amount corresponding to about 5 vol % of the resin filling amount)

Flow rate: SV0.5 (rate in which a solution in the same amount as the resin volume flows in 0.5 hour)
Temperature: normal temperature (about 25° C.)
(HPLC and Analysis Conditions)
Liquid-feeding unit (pump): Prominence LC-20AD (manufactured by Shimadzu Corporation)
Column: (sugar) ULTRON PS-80C, (organic acid) TSK-gel OApak-A
Eluent water: (sugar) ultrapure water, (organic acid) 0.75 mM sulfuric acid aqueous solution
Column oven: Prominence CTO-20A (manufactured by Shimadzu Corporation)
Temperature: (sugar) 80° C., (organic acid) 40° C.
Sugar detector: differential refractive index detector (Prominence RID-20A, manufactured by Shimadzu Corporation)
Organic acid detector: conductivity detector (Prominence CDD-10A, manufactured by Shimadzu Corporation)

As shown in FIG. 3, the respective fractions containing glucose and fructose were detected after the respective fractions containing various fermentation inhibitors (lactic acid, formic acid, and acetic acid), and hence it was shown that the various fermentation inhibitors (lactic acid, formic acid, and acetic acid), and glucose and fructose were able to be separated by the liquid chromatography using the $Na^+$-type strongly acidic cation exchange resin. In addition, when sucrose was previously decomposed into glucose and fructose, larger amounts of glucose and fructose were obtained.

Example 2

(Method of Recovering Sugar Solution by Liquid Chromatography Using $Cl^-$-Type Strongly Basic Anion Exchange Resin)

First, invertase (manufactured by Mitsubishi-Chemical Foods Corporation, derived from yeast, titer: 769 U/mL) was added to molasses having a sugar concentration of 40 w/v % so that its amount became 4 µL per 1 g of the molasses. The mixture was subjected to a reaction under stirring for 24 hours while its temperature was kept at 50° C. Thus, sucrose in the molasses was decomposed into glucose and fructose.

Next, the column was filled with a $Cl^-$-type strongly basic anion exchange resin (manufactured by Mitsubishi Chemical Corporation, product name: "UMA130J", average particle diameter: 300 µm). Next, the invertase-treated molasses was continuously supplied to the column, and the resin was brought into a broken-through state by continuing the supply until the concentrations of various organic acids (lactic acid, formic acid, and acetic acid) at the outlet of the column became the same concentrations as the concentrations of the various organic acids (lactic acid, formic acid, and acetic acid) in the molasses supplied to the column. After that, pure water was sufficiently supplied to wash off the molasses remaining in the column. Next, 11 mL of the molasses was supplied as a sample for separation to the column, and then pure water was supplied as an eluent. Detailed separation conditions and detailed analysis conditions for the resultant fractions are identical to those of Example 1. With regard to a coloring component, images of the respective fractions were taken, and the color depth (chromaticity) of each of the fractions was quantified by analyzing the taken images. The results are shown in FIG. 4.

Figure 4:
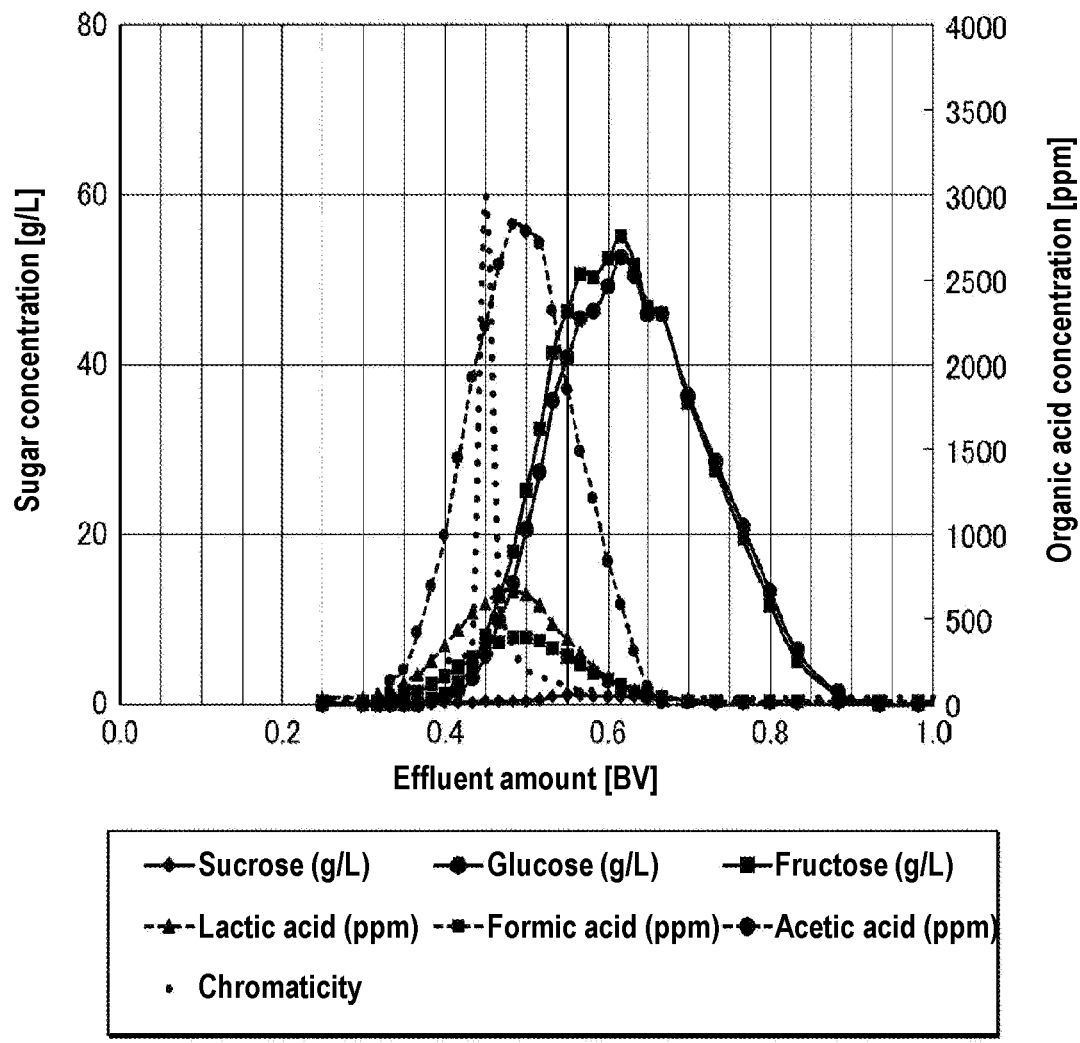
FIG. 4 is a chromatogram (with chromaticity data) in Example 2.

As shown in FIG. 4, the respective fractions containing glucose and fructose were detected after the respective fractions containing various fermentation inhibitors (a coloring component, lactic acid, formic acid, and acetic acid), and hence it was shown that the various fermentation inhibitors (lactic acid, formic acid, and acetic acid), and glucose and fructose were able to be separated by the liquid chromatography using the $Cl^-$-type strongly basic anion exchange resin. In addition, when sucrose was previously decomposed into glucose and fructose, larger amounts of glucose and fructose were obtained.

Comparative Example 1

(Method of Recovering Sugar Solution by Liquid Chromatography Using $Cl^-$-type Strongly Basic Anion Exchange Resin)

A column was filled with a $Cl^-$-type strongly basic anion exchange resin (manufactured by Mitsubishi Chemical Corporation, product name: "UMA130J", average particle diameter: 300 µm). Next, 11 mL of molasses having a sugar concentration of 40 w/v % was supplied to the column, and then pure water was supplied as an eluent. Detailed separation conditions and detailed analysis conditions for the resultant fractions are identical to those of Example 1. The results are shown in FIG. 5.

Figure 5:
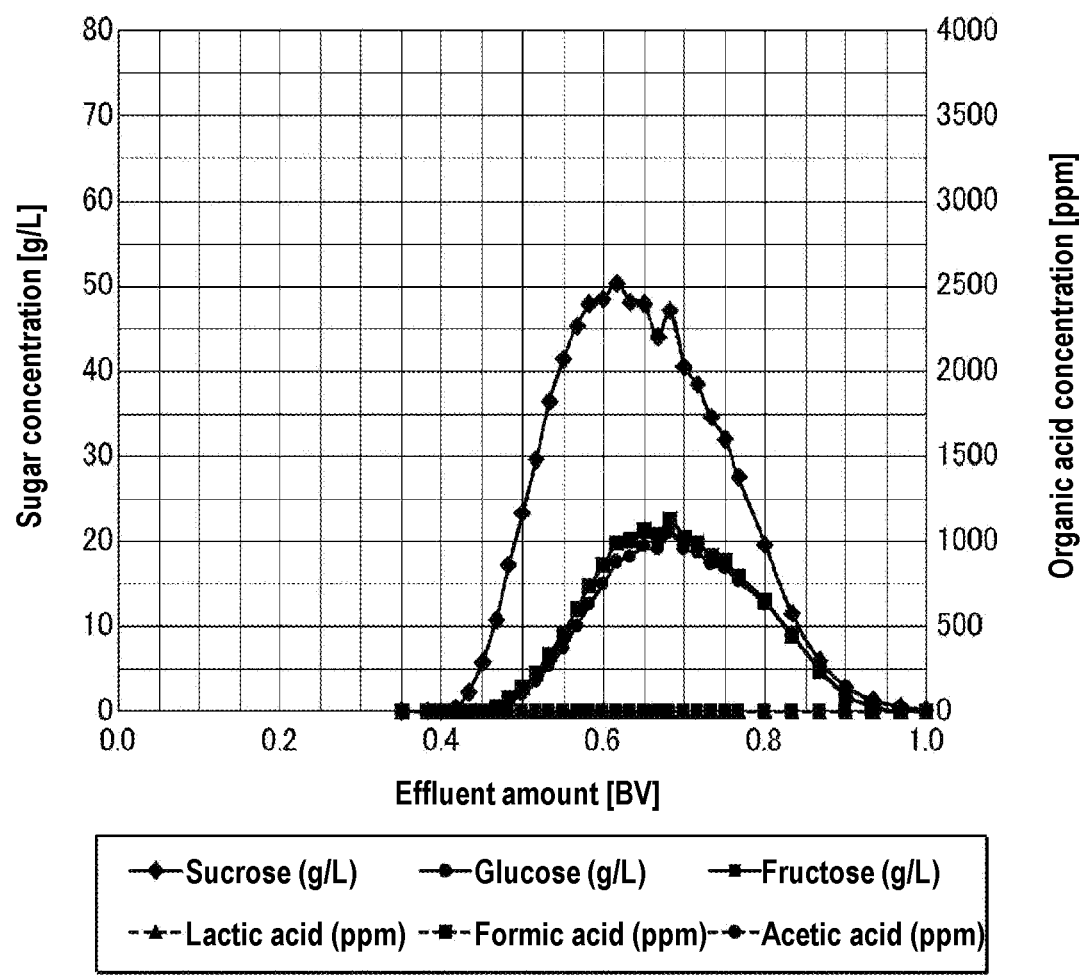
FIG. 5 is a chromatogram in Comparative Example 1.

As shown in FIG. 5, various fermentation inhibitors (lactic acid, formic acid, and acetic acid) were subjected to ion exchange, and hence the concentrations of the organic acids in an effluent became substantially zero. This is caused by adsorption separation, and the various fermentation inhibitors (lactic acid, formic acid, and acetic acid) in the molasses can be removed. However, when adsorption by the ion exchange resin is brought into a saturated state, the various fermentation inhibitors (lactic acid, formic acid, and acetic acid) in the molasses cannot be adsorbed and separated. Accordingly, the ion exchange resin in the saturated state needs to be regenerated, and hence the method of Comparative Example 1 is not suitable for continuous separation.

In contrast, in each of the methods of Examples 1 and 2, the various fermentation inhibitors (lactic acid, formic acid, and acetic acid), and glucose and fructose are separated by utilizing a difference (difference in strength) between their respective chemical affinities for the ion exchange resin. Accordingly, there is no need to regenerate the ion exchange resin, and hence continuous separation can be performed.

Example 3

(Method of Recovering Sugar Solution by Liquid Chromatography Using $Cl^-$-Type Strongly Basic Anion Exchange Resin)

First, invertase (manufactured by Mitsubishi-Chemical Foods Corporation, derived from yeast, titer: 769 U/mL) was added to molasses having a sugar concentration of 40 w/v % so that its amount became 4 µL per 1 g of the molasses. The mixture was subjected to a reaction under stirring for 24 hours while its temperature was kept at 50° C. Thus, sucrose in the molasses was decomposed into glucose and fructose.

Figure 6:
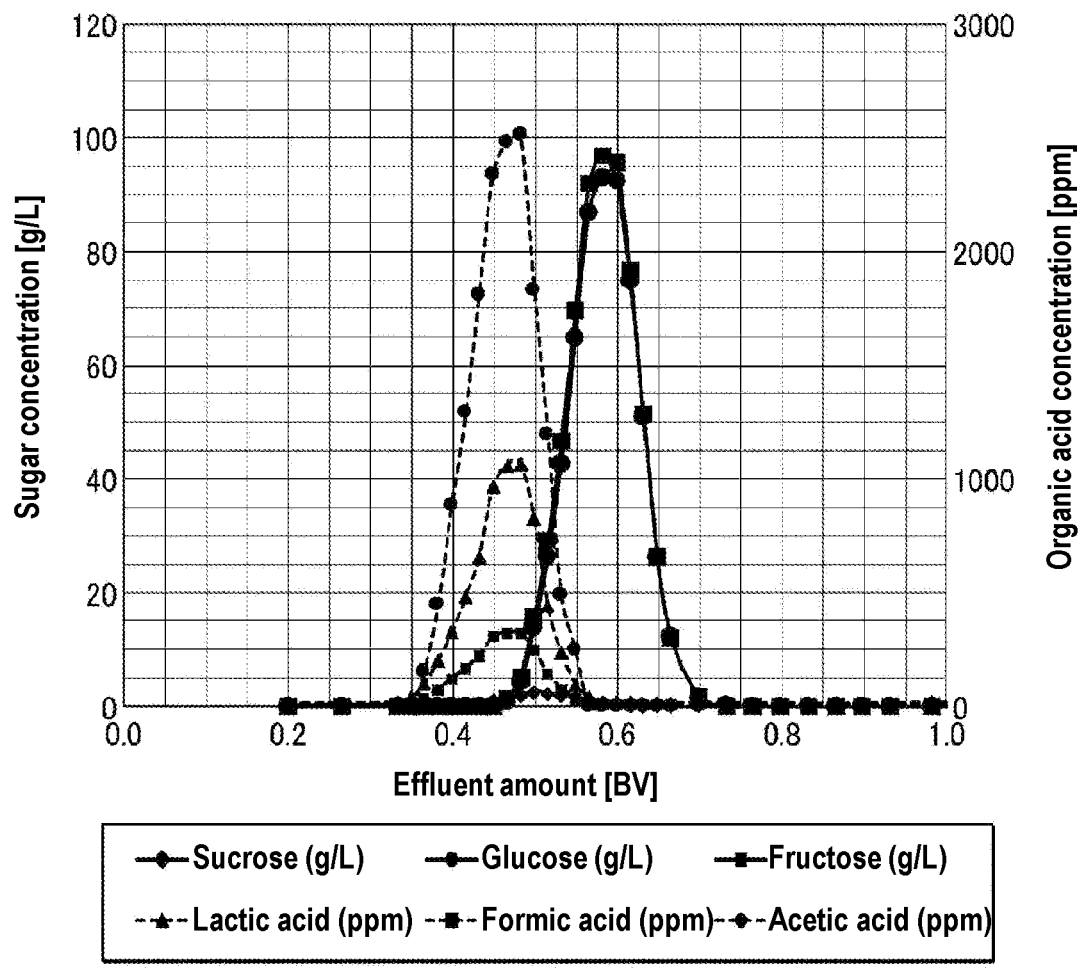
FIG. 6 is a chromatogram in Example 3.

Next, a column was filled with a $Cl^-$-type strongly basic anion exchange resin (manufactured by Mitsubishi Chemical Corporation, product name: "UMA130J", average particle diameter: 300 µm). Next, the invertase-treated molasses was continuously supplied to the column, and the resin was brought into a broken-through state by continuing the supply until the concentrations of various organic acids (lactic acid, formic acid, and acetic acid) at the outlet of the column became the same concentrations as the concentrations of the various organic acids (lactic acid, formic acid, and acetic acid) in the molasses supplied to the column. After that, pure water was sufficiently supplied to wash off the molasses remaining in the column. Next, 15 mL of the molasses was supplied as a sample for separation to the column, and then pure water was supplied as an eluent. Detailed separation conditions are as described below. In addition, detailed analysis conditions for the resultant fractions are identical to those of Example 1. The results are shown in FIG. 6.

(Chromatographic Separator and Separation Conditions)

Liquid-feeding unit (pump): SMP-23S (Tokyo Rikakikai Co., Ltd.)

Column: 20 mmφ×980 mm (with a jacket)

Resin filling amount: 307.7 mL

Molasses liquid-feeding amount: 15 mL (amount corresponding to about 5 vol % of the resin filling amount)

Flow rate: SV0.5 (rate in which a solution in the same amount as the resin volume flows in 0.5 hour)

Temperature: 60° C.

As shown in FIG. 6, the respective fractions containing glucose and fructose were detected after the respective fractions containing various fermentation inhibitors (lactic acid, formic acid, and acetic acid), and hence it was shown that the various fermentation inhibitors (lactic acid, formic acid, and acetic acid), and glucose and fructose were able to be separated by the liquid chromatography using the $Cl^-$-type strongly basic anion exchange resin. In addition, when sucrose was previously decomposed into glucose and fructose, larger amounts of glucose and fructose were obtained.

Further, in the chromatogram (FIG. 6) of Example 3 performed under 60° C., particularly the peaks of glucose and fructose each became sharp as compared to the chromatogram (FIG. 4) of Example 2 performed under normal temperature (25° C.). It was suggested from the foregoing that when the temperature at the time of the separation and the recovery was increased, the efficiency with which glucose and fructose, and the fermentation inhibitors were separated was improved, and the concentrations of the sugars to be recovered were able to be increased.

Example 4

(Method of Recovering Sugar Solution by Liquid Chromatography Using $Cl^-$-Type Strongly Basic Anion Exchange Resin)

First, a column was filled with a $Cl^-$-type strongly basic anion exchange resin (manufactured by Mitsubishi Chemical Corporation, product name: "UMA130J", average particle diameter: 300 µm). Next, molasses having a sugar concentration of 40 w/v % was continuously supplied to the column, and the resin was brought into a broken-through state by continuing the supply until the concentrations of various organic acids (lactic acid, formic acid, and acetic acid) at the outlet of the column became the same concentrations as the concentrations of the various organic acids (lactic acid, formic acid, and acetic acid) in the molasses supplied to the column. After that, pure water was sufficiently supplied to wash off the molasses remaining in the column. Next, 15 mL of a bagasse saccharified liquid having a sugar concentration of 8 w/v % was supplied as a sample for separation to the column, and then pure water was supplied as an eluent. Detailed separation conditions are the same as those of Example 3. In addition, detailed analysis conditions for the resultant fractions are identical to those of Example 1. The results are shown in FIG. 7.

Figure 7:
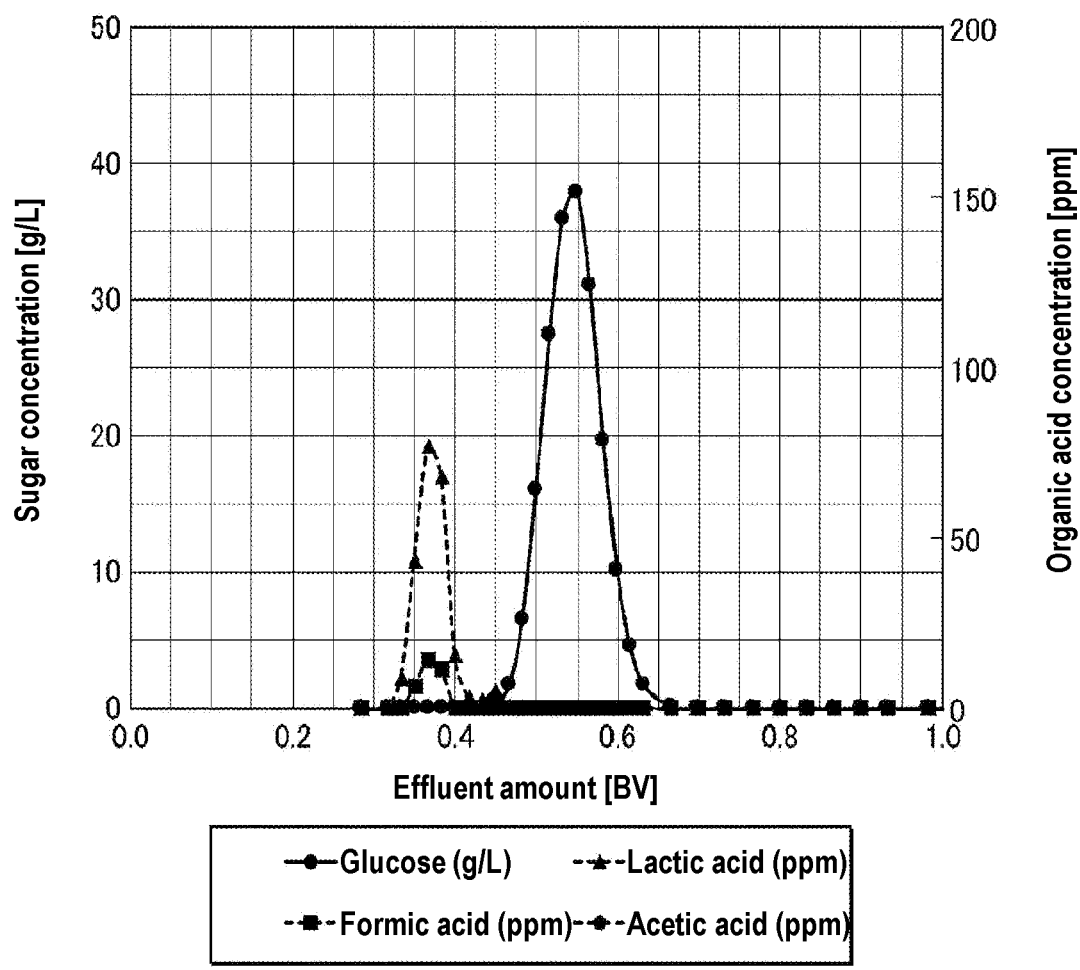
FIG. 7 is a chromatogram in Example 4.

As shown in FIG. 7, also in the bagasse saccharified liquid, as in the molasses, the fraction containing glucose was detected after the respective fractions containing the various fermentation inhibitors (lactic acid, formic acid, and acetic acid), and hence it was shown that the various fermentation inhibitors (lactic acid, formic acid, and acetic acid), and glucose were able to be separated by the liquid chromatography using the $Cl^-$-type strongly basic anion exchange resin.

Example 5

(Method of Recovering Sugar Solution by Liquid Chromatography Using $Cl^-$-Type Strongly Basic Anion Exchange Resin)

First, a column was filled with a $Cl^-$-type strongly basic anion exchange resin (manufactured by Mitsubishi Chemical Corporation, product name: "UMA130J", average particle diameter: 300 µm). Next, a bagasse saccharified liquid having a sugar concentration of 10 w/v % was continuously supplied to the column, and the resin was brought into a broken-through state by continuing the supply until the concentrations of various organic acids (formic acid and acetic acid) at the outlet of the column became the same concentrations as the concentrations of the various organic acids (formic acid and acetic acid) in the molasses supplied to the column. After that, pure water was sufficiently supplied to wash off the molasses remaining in the column. Next, 15 mL of the bagasse saccharified liquid having a sugar concentration of 10 w/v% was supplied as a sample for separation to the column, and then pure water was supplied as an eluent. Detailed separation conditions are the same as those of Example 3. In addition, detailed analysis conditions for the resultant fractions are identical to those of Example 1. The results are shown in FIG. 8.

Figure 8:
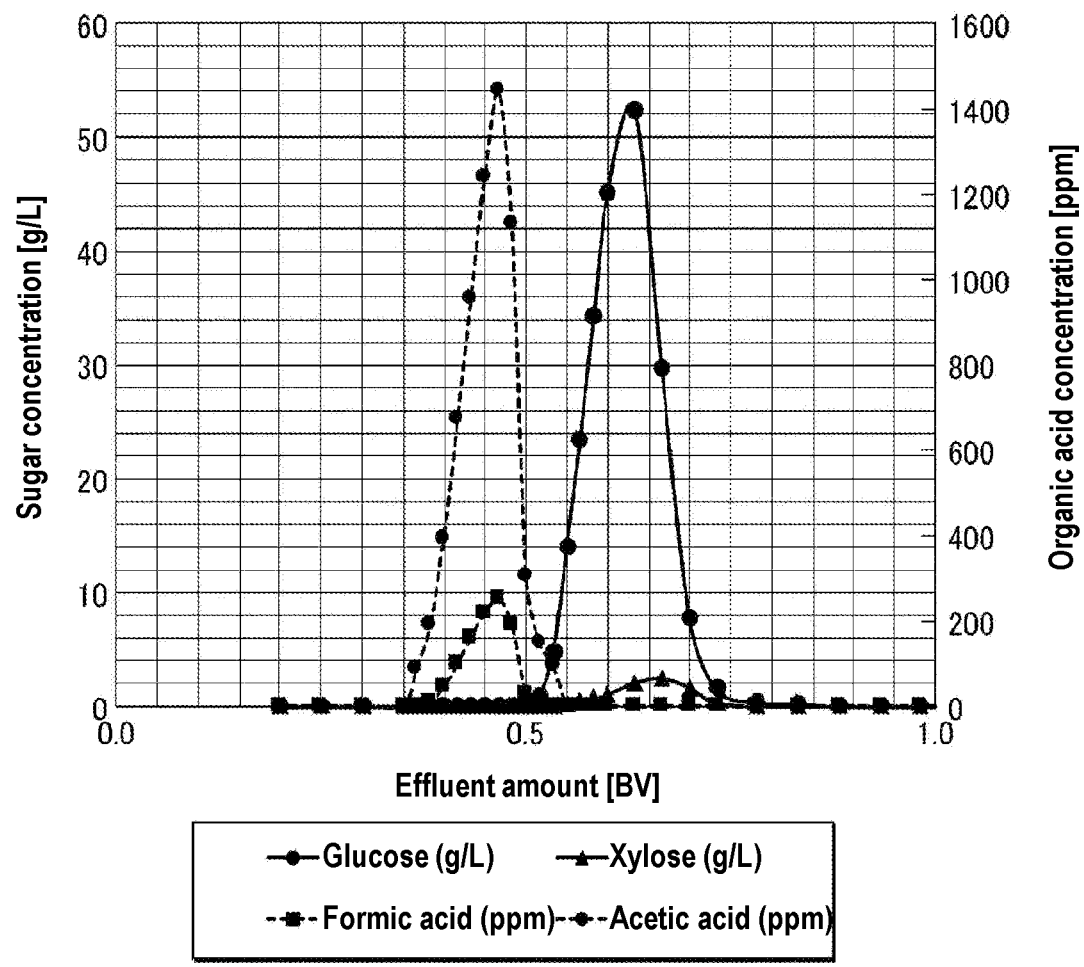
FIG. 8 is a chromatogram in Example 5.

As shown in FIG. 8, also in the bagasse saccharified liquid, as in the molasses, the fraction containing glucose and xylose was detected after the respective fractions containing the various fermentation inhibitors (formic acid and acetic acid), and hence it was shown that the various fermentation inhibitors (formic acid and acetic acid), and glucose and xylose were able to be separated by the liquid chromatography using the $Cl^-$-type strongly basic anion exchange resin.

Example 6

(Relationship Between Average Particle Diameter and Separation Degree of Ion Exchange Resin)

Sugar recovery was performed by using the same method as that of Example 3 except that $Cl^-$-type strongly basic anion exchange resins having different average particle diameters were used.

The average particle diameters of the $Cl^-$-type strongly basic anion exchange resins were measured and calculated on the basis of "PARTICLE SIZE DISTRIBUTION" specified in ASTM D2187-17. As a result, the average particle diameters of the used 12 kinds of $Cl^-$-type strongly basic anion exchange resins were 125 µm, 250 µm, 300 µm, 350 µm, 550 µm, 570 µm, 575 µm, 650 µm, 675 µm, 740 µm, 750 µm, and 812 µm, respectively.

In addition, the degree to which lactic acid (selected as a typical example of the fermentation inhibitor) and glucose (selected as a typical example of the sugar) were separated by each of the anion exchange resins was calculated on the basis of the calculation equation of "PEAK RESOLUTION" specified in ASTM E682-92 (corresponding to "3.21 of JIS K0124:2011 General Rules for High Performance Liquid Chromatography). A graph showing a relationship between the average particle diameter and separation degree of each of the anion exchange resins is shown in FIG. 9.

Figure 9:
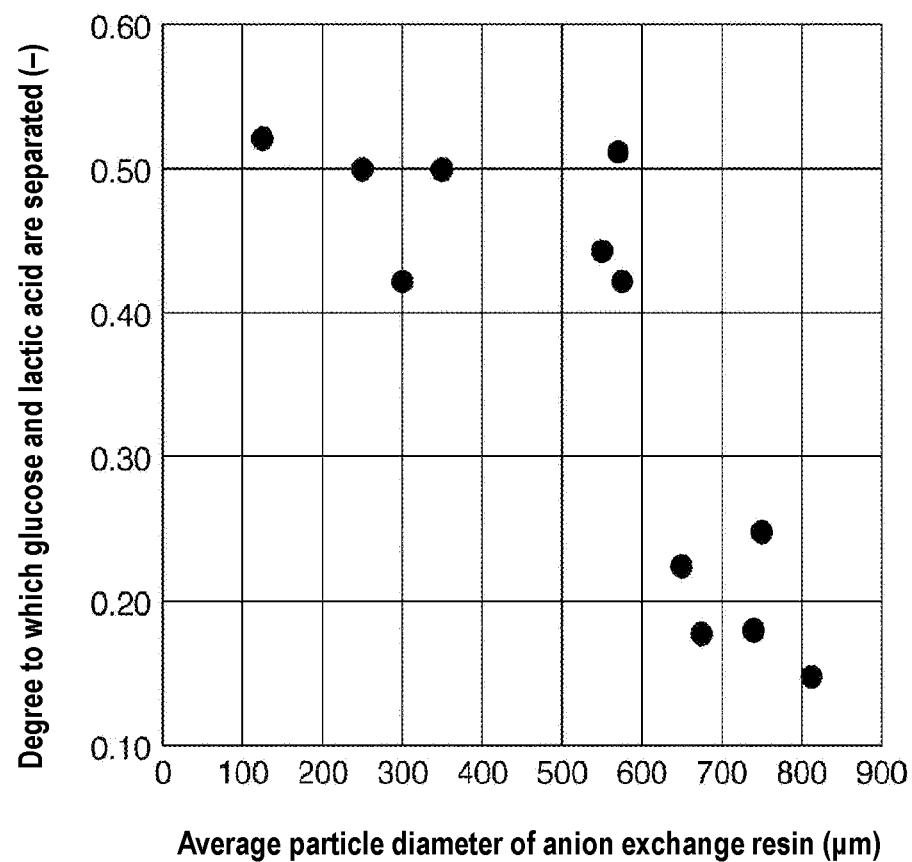
FIG. 9 is a graph for showing a relationship between the average particle diameter and separation degree of an anion exchange resin in Example 6.

As shown in FIG. 9, it was elucidated that when an anion exchange resin having an average particle diameter of 125 μm or more and 575 μm or less was used in the method of this embodiment, the degree to which glucose and lactic acid were separated was particularly high.

It was suggested from the foregoing that when an anion exchange resin having an average particle diameter within a specific numerical range was used in the method of this embodiment, the degree to which the sugar and the fermentation inhibitor were separated was particularly excellent.

Example 7

(Relationship Between Recovery Temperature and Separation Degree)

Figure 10:
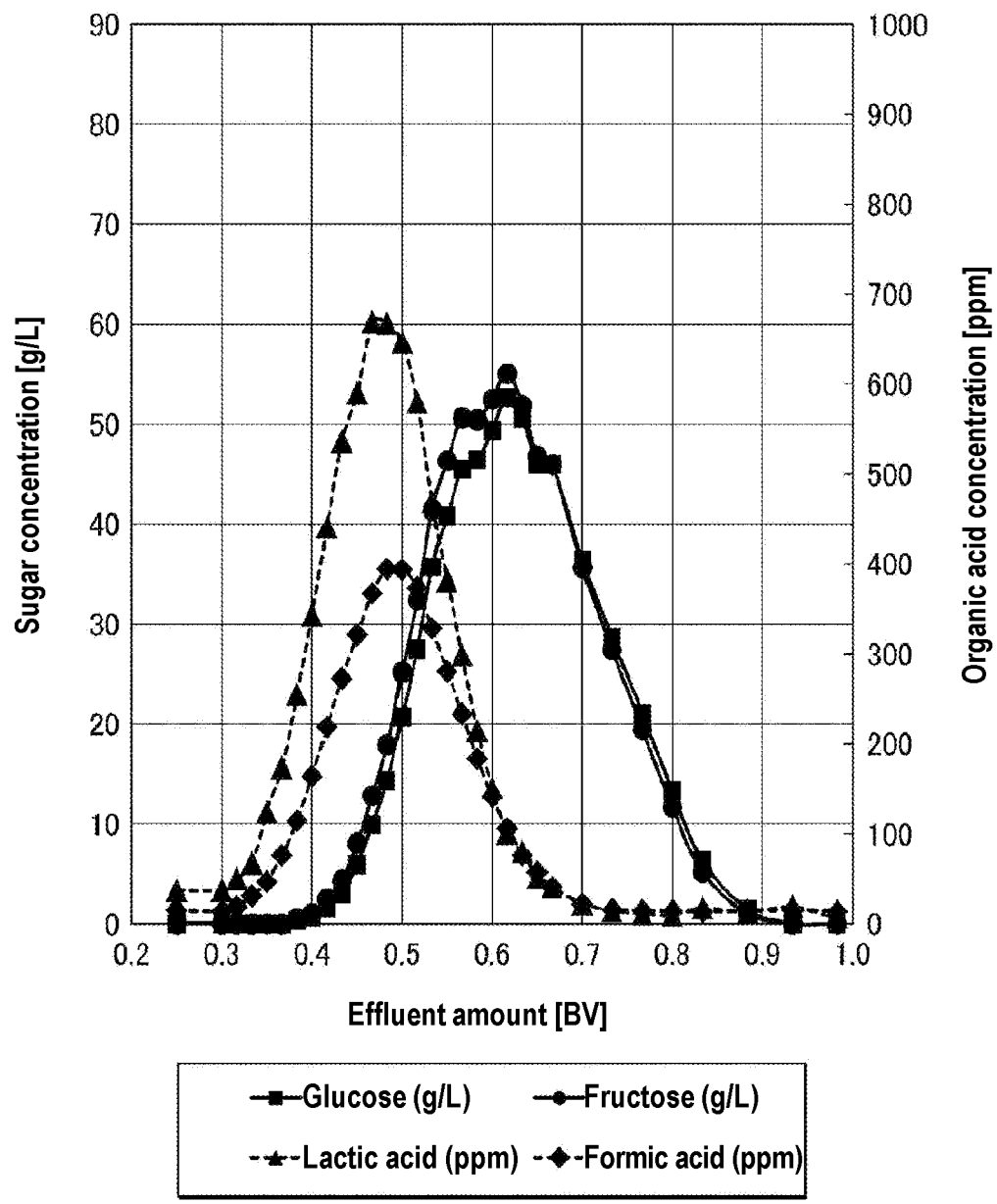
FIG. 10 is a chromatogram (normal temperature) in Example 7.
Figure 11:
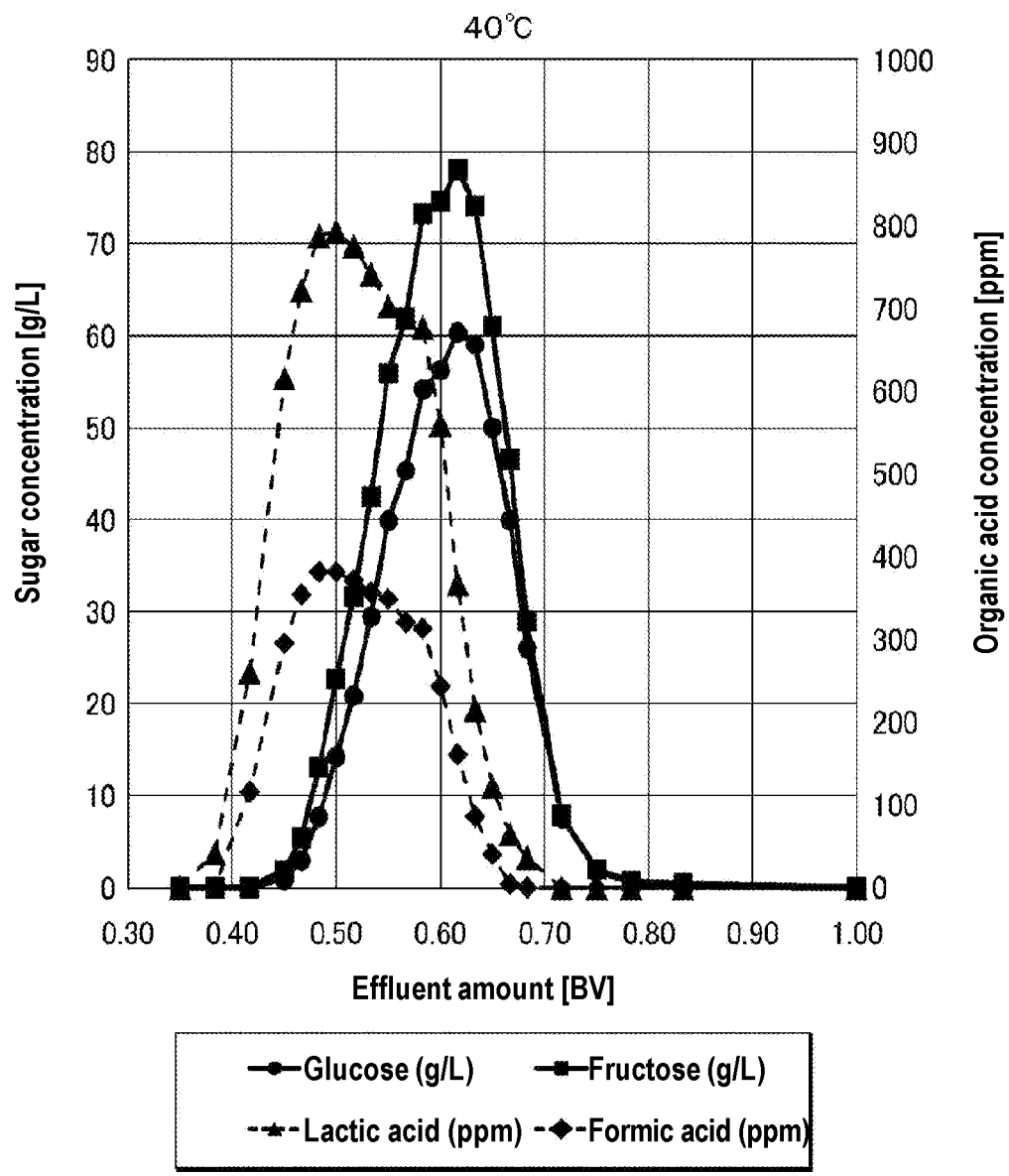
FIG. 11 is a chromatogram (40° C.) in Example 7.
Figure 12:
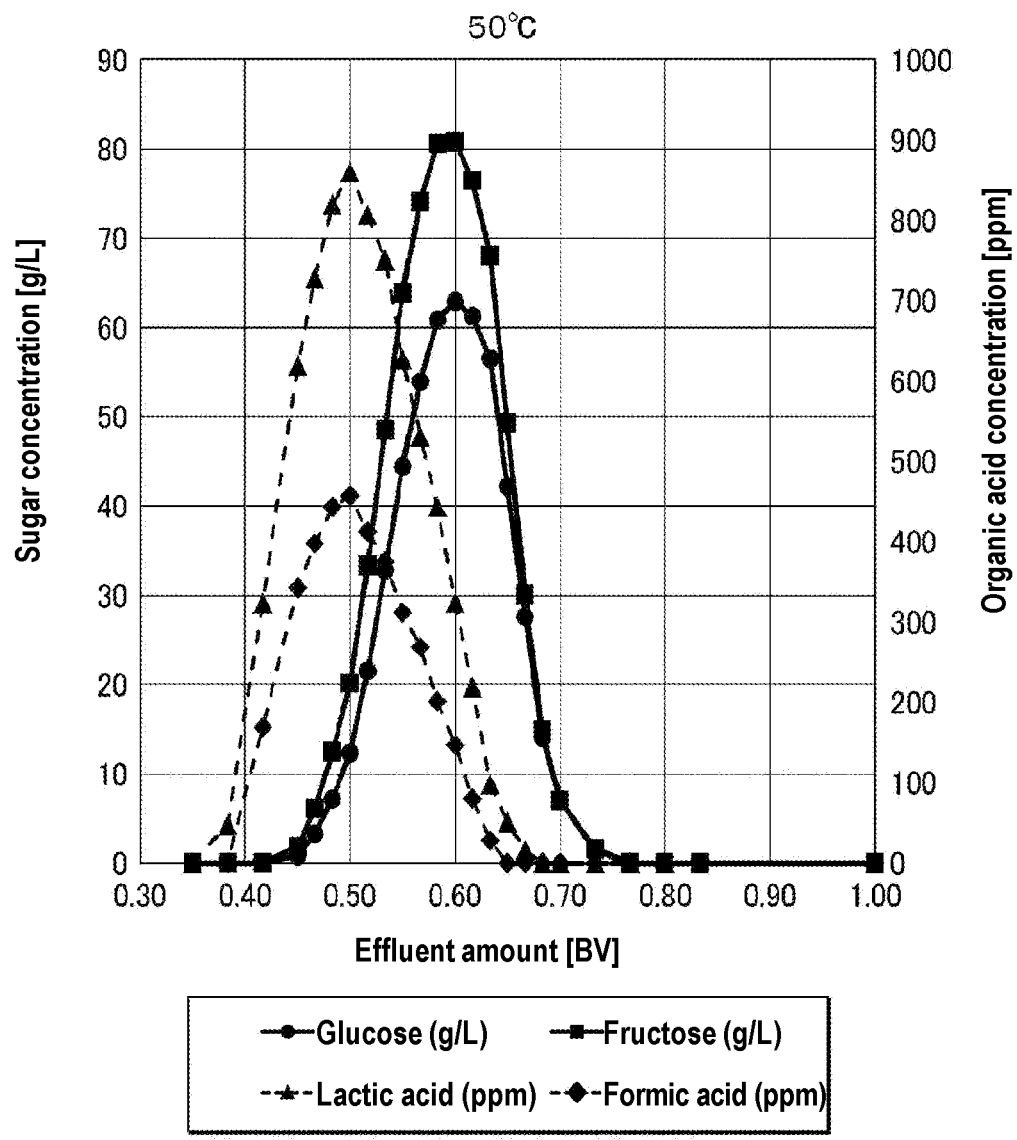
FIG. 12 is a chromatogram (50° C.) in Example 7.
Figure 13:
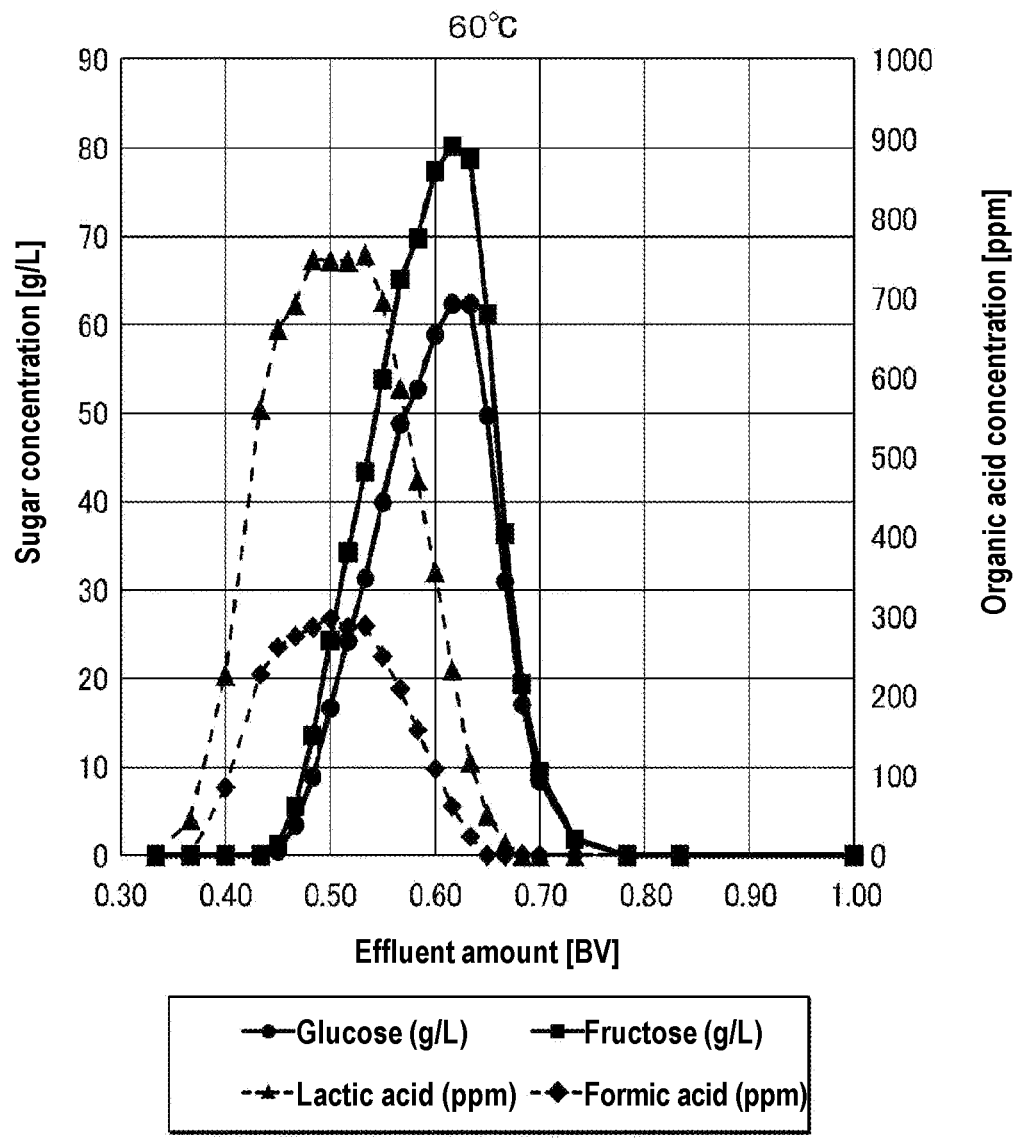
FIG. 13 is a chromatogram (60° C.) in Example 7.

Sugar recovery was performed by using the same method as that of Example 3 except that with regard to the separation conditions in the chromatographic separator, the temperature was set to normal temperature (about 20° C. or more and about 25° C. or less), 40° C., 50° C., and 60° C. In addition, detailed analysis conditions for the resultant fractions are identical to those of Example 1. The results are shown in FIG. 10 (normal temperature), FIG. 11 (40° C.), FIG. 12 (50° C.), and FIG. 13 (60° C.).

As shown in FIG. 10 to FIG. 13, glucose and fructose, and lactic acid and formic acid were able to be separated at each of the temperatures. In addition, the following tendency was observed: as the temperature became higher, the peaks of glucose and fructose each became sharper. Meanwhile, the following tendency was observed: as the temperature became lower, the deterioration of the anion exchange resin at the time of the performance of continuous separation was further suppressed, and hence continuous sugar separation was able to be performed for a longer time period (detailed data is omitted).

It was suggested from the foregoing that in view of a balance between the separation degree and the durability of the resin at the time of the continuous separation, when the temperature at the time of the separation fell within a specific numerical range, the sugar was able to be efficiently recovered.

INDUSTRIAL APPLICABILITY

According to the method of the embodiments, the sugar can be recovered by separating the fermentation inhibitor and the sugar from the sugar solution containing the fermentation inhibitor at low cost and with satisfactory separation efficiency.

REFERENCE SIGNS LIST

1 . . . liquid chromatograph, 1*a* . . . simulated moving layer chromatographic separator, 2 . . . eluent-supplying portion, 2*a* . . . eluent (water), 3 . . . liquid-feeding portion, 4 . . . sample-injecting portion, 5 . . . separating portion, 5*a* . . . column, 5*b* . . . column oven, 6 . . . detecting portion, 7 . . . data-processing portion, 8 . . . fraction collector, 9*a* . . . fraction containing sugar (saccharine component), 9*b* . . . fraction containing fermentation inhibitor, 10, 20 . . . apparatus, 11, 12 . . . pump.

The invention claimed is:

1. A method of recovering a sugar by separating a fermentation inhibitor and the sugar from a sugar solution containing the fermentation inhibitor, the method comprising bringing the sugar solution containing the fermentation inhibitor into contact with an ion exchange resin filled into a column, followed by separation of the fermentation inhibitor and the sugar by a difference in retention time therebetween through use of water as an eluent, and separate recovery of a fraction containing the fermentation inhibitor and a fraction containing the sugar, wherein the ion exchange resin is previously treated with a solution containing the fermentation inhibitor such that the ion exchange resin is saturated with an arbitrary ion component in the sugar solution containing the fermentation inhibitor.

2. The method according to claim 1, wherein the ion exchange resin is a strongly basic anion exchange resin or a strongly acidic cation exchange resin.

3. The method according to claim 1, wherein the ion exchange resin has an average particle diameter of 100 μm or more and 600 μm or less.

4. The method according to claim 1, further comprising, at a time of the previous treatment with the solution containing the fermentation inhibitor, bringing the sugar solution containing the fermentation inhibitor into contact with the ion exchange resin to cause the ion exchange resin to adsorb the fermentation inhibitor, to thereby separate the fermentation inhibitor and the sugar.

5. The method according to claim 1, wherein in the recovery, the fraction containing the sugar is recovered after the fraction containing the fermentation inhibitor.

6. The method according to claim 1, wherein the recovery is performed at a temperature of 25° C. or more.

7. The method according to claim 1, wherein the fermentation inhibitor comprises at least one kind selected from the group consisting of: an organic acid; and a coloring component.

8. The method according to claim 1, wherein the sugar solution containing the fermentation inhibitor comprises a monosaccharide.

9. The method according to claim 1, wherein the sugar solution containing the fermentation inhibitor comprises sucrose.

10. The method according to claim 9, further comprising, before the recovery, decomposing the sucrose into glucose and fructose.

\* \* \* \* \*